May 12, 1970  D. C. HANNA  3,511,187
APPARATUS FOR TRANSPORTING VEHICLES
Filed May 4, 1967
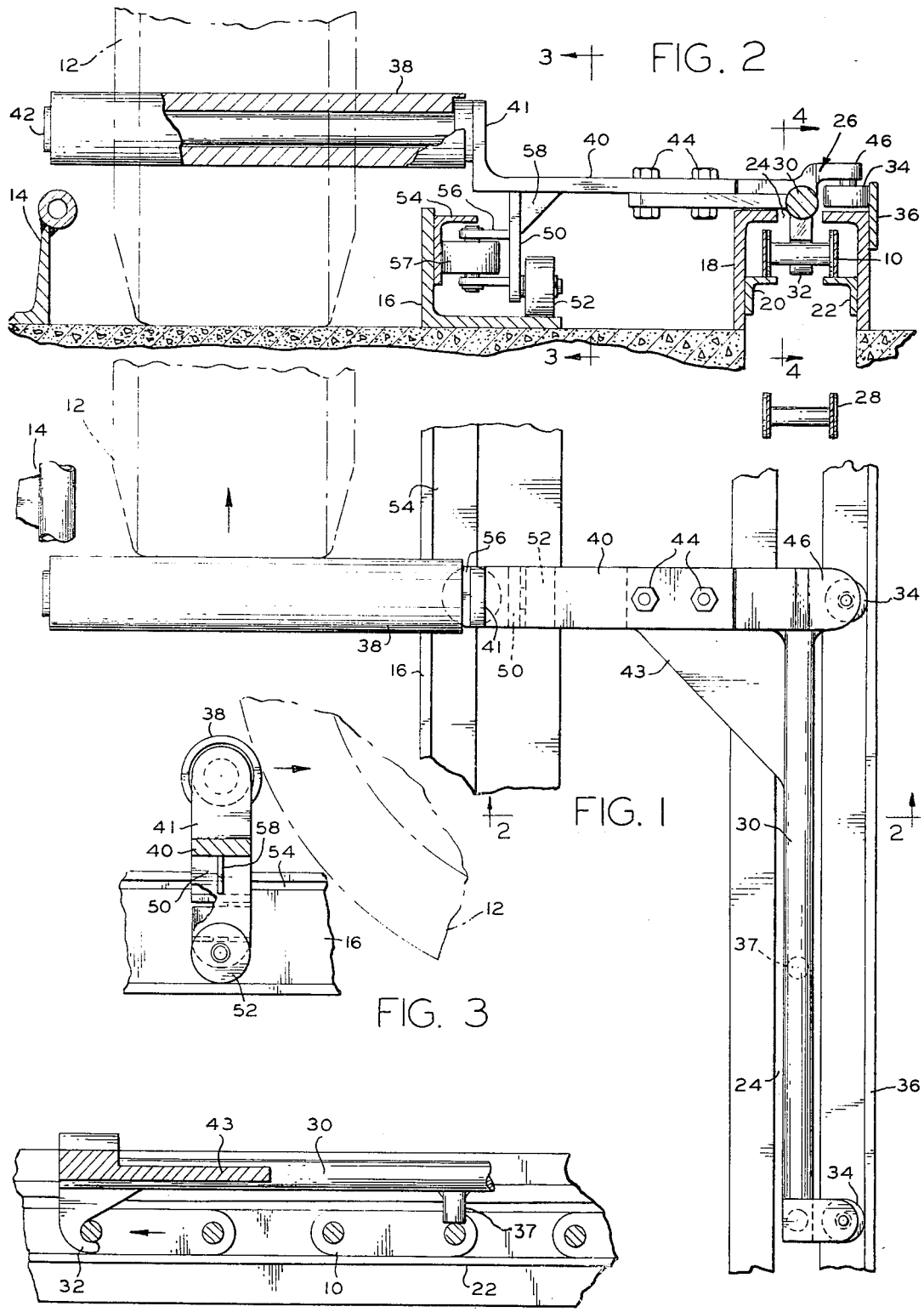
DANIEL C. HANNA
INVENTOR
BY
BUCKHORN, BLORE, KLARQUIST & SPARKMAN
ATTORNEYS United States Patent Office 3,511,187
Patented May 12, 1970

3,511,187
APPARATUS FOR TRANSPORTING VEHICLES
Daniel C. Hanna, 16325 SE. Cherry Court,
Milwaukie, Oreg.
Filed May 4, 1967, Ser. No. 636,051
Int. Cl. B65g *19/00;* B61b *13/12*
U.S. Cl. 104—172                    3 Claims

ABSTRACT OF THE DISCLOSURE

A drive means is provided for a conventional car wash conveyor or the like, such drive means including an attaching member adapted for detachable engagement with the conveyor chain. The drive means is further provided with a horizontally extending cantilever arm supporting a roller at the end thereof, the roller being positioned for engaging the wheel or tire of a vehicle. The arm is braced such that movement of the chain pushes the roller against the vehicle tire to cause movement of the vehicle.

BACKGROUND OF THE INVENTION

Car wash conveyors and the like normally extend centrally along a track upon which the automobile or other vehicle is to be moved by the conveyor during a washing operation. The vehicle may be connected to the conveyor by means of a bumper hook or alternatively, the conveyor may be provided with a pusher bar engageable with the rear bumper of the vehicle for pushing the vehicle along the track. In either case, damage can be inadvertently caused through distortion or misalignment of the vehicle's bumper or frame.

Conveyor systems have also been proposed for providing rolling contact with a vehicle's tires whereby contact with the vehicle's frame or bumper is avoided. However, systems of this type are not generally compatible with already-installed conveying equipment in car wash installations, but require an entirely different and new installation.

SUMMARY OF THE INVENTION

According to the present invention a drive means for engaging the tires of a vehicle includes an attaching member adapted for providing detachable engagement with a conventional conveyor. This attaching member may be hooked on to the conventional car wash conveyor at any point and may be removed therefrom at will. The drive means is braced along the conveyor and, in one specific embodiment of the invention, is provided with a horizontally extending cantilever arm upon which a tire-contacting roller is mounted. Movement of the conveyor forces the roller against the tire for transporting of the vehicle along the conveyor as rolling engagement is established between the tire and the roller.

It is accordingly an object of the present invention to provide means for converting a conventional vehicle conveyor to one providing rolling engagement with the vehicle tires.

It is a further object of the present invention to provide improved means for transporting vehicles, including roller contact means, wherein such means may be selectively disengaged from a conveyor.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 1 is a top view of a vehicle transporting apparatus including detachable drive means according to the present invention;

FIG. 2 is a cross section of the apparatus according to the present invention taken at 2—2 in FIG. 1;

FIG. 3 is a cross section of the apparatus according to the present invention taken at 3—3 in FIG. 2; and FIG. 4 is a cross section of the apparatus taken at 4—4 in FIG. 2.

DETAILED DESCRIPTION

Referring to the drawings, apparatus according to the present invention is adaptable to a conveyor means comprising a roller conveyor chain 10 extending along a track at least from a first location to a second location between which vehicles are to be moved and driven by a known drive (not shown). This conveyor means may comprise the conventional conveyor means employed in a car wash or the like for transporting an automobile along the wash line wherein various washing, rinsing and drying operations are performed. The vehicle is guided along a straight path by steel guide angles or guide bars 14 and 16 comprising a track. Tires of the vehicle, e.g. tire 12, are initially positioned along and upon the track which is parallel to the conveyor means. It is understood that tire 12, as viewed in FIGS. 1 and 2, comprises the lefthand vehicle tire and the righthand vehicle tire may be disposed along and upon a similar track on the remote side of the conveyor means. The roller chain is shown positioned between the vehicle tracks, but may be directly under and extend along the track bounded by the angles 14 and 16.

The roller chain 10 of the conveyor means is located within a box-like enclosure or hollow conveyor guide 18 which is positioned along the level of the floor or track, i.e. at a level underneath the vehicle's frame and body. The enclosure 18, which may be formed of steel, includes a pair of shelf angles 20 and 22 disposed along the inside walls of the enclosure and providing means upon which roller chain 10 may ride. The enclosure 18 is also provided with a top opening or slot 24 extending longitudinally in the top thereof. It is understood that means are provided (not shown) for driving the roller chain longitudinally within enclosure 18. The roller chain may also return underneath the level of the vehicle track as indicated at 28 so as to form a continuous driven chain loop.

An attaching member in the form of a generally L-shaped, detachable pusher member, forming a part of drive means according to the present invention and generally indicated at 26, engages the roller chain through slot 24. Attaching member 26 includes a horizontal brace or attaching arm 30 positioned longitudinally along the slot 24 and provided with a plurality of hooks 32 for selectively engaging links in chain 10. In the illustrated example, one such hook is located at each end of brace 30. Brace 30 also carries a pair of bearing rollers 34 at both ends thereof which ride along an upright rail or guide bar 36 secured to the righthand side of enclosure 18 for aiding in constraining brace 30 in a substantially longitudinal position along the chain 10. Brace 30 is further provided with a vertically downwardly extending pin 37 which protrudes in guiding relation into the slot 24.

The drive means according to the present invention further includes an elongated drive roller 38 on the end of a cantilever pushing arm 40 extending horizontally from brace 30 toward the position of tire 12. Upward extension 41 of arm 40 carries journal means 42 upon which roller 38 is mounted for a rotation about a horizontal axis, which axis is perpendicular to the line of travel of a vehicle tire along the track. The roller is positioned on journal means 42 at a level between the level of the track and the level of the vehicle frame and body. The cantilever arm 40 is perpendicular to brace 30 and extends horizontally from brace 30. The arm 40 is secured to a truss 43 by means of bolts 44, the truss 43 being welded to the brace 30. A support ear 46 to which the forward bearing roller 34 is attached is welded to the truss.

The arm 40 desirably includes a downwardly extending support 50 disposed between the attaching member 26 and the roller 38. The support 50 supports arm 40 in a substantially horizontal position. For this purpose, the support 50 is suitably provided with a wheel or a roller 52 attached to the lower end thereof and adapted for travel in the direction of movement of chain 10. The roller 52 rides along the approximate plane of the portion of the track between angles 14 and 16. The roller 52 is arranged to travel along the lower flange of the angle 16.

An angular rail means 54 is supported longitudinally along the track as by joining the same to the upright flange of angle 16. The rail means extends horizontally over a stop 56 extending from support 50 on arm 40 so that the stop 56 cannot move upwardly past the rail when roller 38 pushes against a tire having high lugs. A gusset 58 also is joined to support 50 and arm 40. A horizontal bearing roller 57 carried by the stop 56 bears against the lower vertical flange of the rail means 54. As the roller 38 pushes against tire 12, bearing roller 57 helps constrain brace 30 in a longitudinal position along the conveyor, and maintains the roller 38 perpendicular to the line of vehicle travel. As the conveyor means 10 moves in to the right, as viewed in FIG. 3, the roller 38 is forced against the tire 12 to provide rolling engagement with the tire and move the vehicle to the right. As the vehicle moves in this direction, the roller 38 turns in a counterclockwise direction as viewed in FIG. 3, while tire 12 turns in a clockwise direction.

The cantilever arm 40 carrying the roller 38 is rigidly attached to the brace 30 and is connected by the chain 32 and by the bearing rollers 34 and 37 so that it cannot turn with respect to chain 10 and enclosure 18. Therefore, the roller 38 continues to apply pressure directly behind tire 12. The brace 30, together with the arm 40, acts as a lever which maintains the brace 30 in an orientation along the conveyor means and which maintains the roller 38 along an axis perpendicular with the vehicle line of travel. The fulcrum of such lever is the roller 57. The brace 30 may be restrained at some other angular orientation with respect to the conveyor, but desirably at least a large component of its direction is along the conveyor. The hooks 32 of the brace 30 may be readily pulled forwardly from the crosspins of the chain 10 and the attaching member 26 removed from the conveyor means and the rail means 54, and the attaching member also can be reinserted easily into hooking engagement with the chain and in engagement with the rail means.

Apparatus is thus provided according to the present invention for driving a vehicle along a track without establishing contact with the frame or bumper of the vehicle. Moreover, the apparatus thus provided is adaptable to the conventional car wash conveyor and may be attached and detached from such conveyor at will. While the attaching member 26 is of the cantilever or offset type adapted to be used with a conveyor means offset from the track of the car wash, the roller 38 obviously can be mounted in a centered relationship on the brace 30 for use with a car wash in which the conveyor chain is directly below the track on which the tire 12 is to be rolled.

While I have shown and described a preferred embodiment of my invention, it will be apparent to those skilled in the art that many changes and modifications may be made without departing from my invention in its broader aspects. I therefore intend the appended claims to cover all such changes and modifications as fall within the true spirit and scope of my invention.

I claim:
1. In a car wash conveyor,
an endless conveyor chain,
a track along which the wheels of one side of a car are adapted to travel,
a hollow conveyor guide spaced inwardly from the track and extending parallel to the track and having a slot extending therealong,
means mounting the chain for travel in which one course thereof extends along the interior of the guide,
a first guide bar secured to the conveyor guide in a position remote from the track and extending therealong and projecting above the conveyor guide,
a second guide bar in a position parallel to the first guide bar and near the inner side of the track,
and a generally L-shaped, detachable pusher member having an attaching arm, a pushing arm, a pushing roller mounted on a free end of the pushing arm and extending therebeyond parallel to the pushing arm, a hook on the attaching arm adapted to project through the slot and hook on the chain and movable along the slot, a first guide roller on the attaching arm spaced from the hook and normally rotatable on a vertical axis and adapted to engage the surface of the first guide bar facing the track, and a second guide roller on the pushing arm and normally rotatable on a vertical axis and adapted to engage the surface of the second guide bar away from the track,
the guide rollers being adapted to maintain the pushing roller in a position extending across the track.

2. The car wash conveyor of claim 1 including a third guide roller on the pushing arm and normally rotatable on a horizontal axis and rollable along the floor to support the pushing roller in a position elevated from the floor.

3. The car wash conveyor of claim 2 wherein the second guide bar includes a first portion lying in a vertical plane for guiding the second guide roller and a second portion lying in a horizontal plane and adapted to support and guide the third guide roller.

References Cited

UNITED STATES PATENTS

| | | | |
|---|---|---|---|
| 2,016,662 | 10/1935 | Aitken | 105—27 |
| 3,058,433 | 10/1962 | Hurst | 104—172 |
| 3,196,806 | 7/1965 | Brunder | 104—172 |
| 3,233,557 | 2/1966 | Rickel | 104—172 |
| 3,260,219 | 7/1966 | Vani | 104—172 |
| 3,404,639 | 10/1968 | Lindquist | 104—172 |
| 3,424,103 | 1/1969 | Suraci | 104—172 |

ARTHUR L. LA POINT, Primary Examiner

R. SAIFER, Assistant Examiner

U.S. Cl. X.R.

104—178

PO-1050
(5/69)

UNITED STATES PATENT OFFICE
CERTIFICATE OF CORRECTION

Patent No. 3,511,187      Dated May 12, 1970

Inventor(s) Daniel C. Hanna

It is certified that error appears in the above-identified patent and that said Letters Patent are hereby corrected as shown below:

Col. 3, line 38, "connected" should be -- constrained --

Col. 3, line 39, "37" should be -- 57 --

SIGNED AND
SEALED
SEP 1 - 1970

(SEAL)
Attest:

Edward M. Fletcher, Jr.
Attesting Officer

WILLIAM E. SCHUYLER, JR.
Commissioner of Patents